Oct. 27, 1964 M. E. H. BREUNING 3,154,261

MAGAZINE FOR MAGNETIC TAPE RECORDERS

Filed Feb. 26, 1962

INVENTOR
MAXIMILIAN E. H. BREUNING
BY
AGENT

United States Patent Office 3,154,261
Patented Oct. 27, 1964

3,154,261

MAGAZINE FOR MAGNETIC TAPE RECORDERS

Maximilian Emil Hubert Breuning, Eindhoven, Netherlands, assignor to North American Philips Company, Inc., New York, N.Y., a corporation of Delaware Filed Feb. 26, 1962, Ser. No. 175,538
Claims priority, application Austria Mar. 13, 1961
4 Claims. (Cl. 242—55.13)

Figure 1:
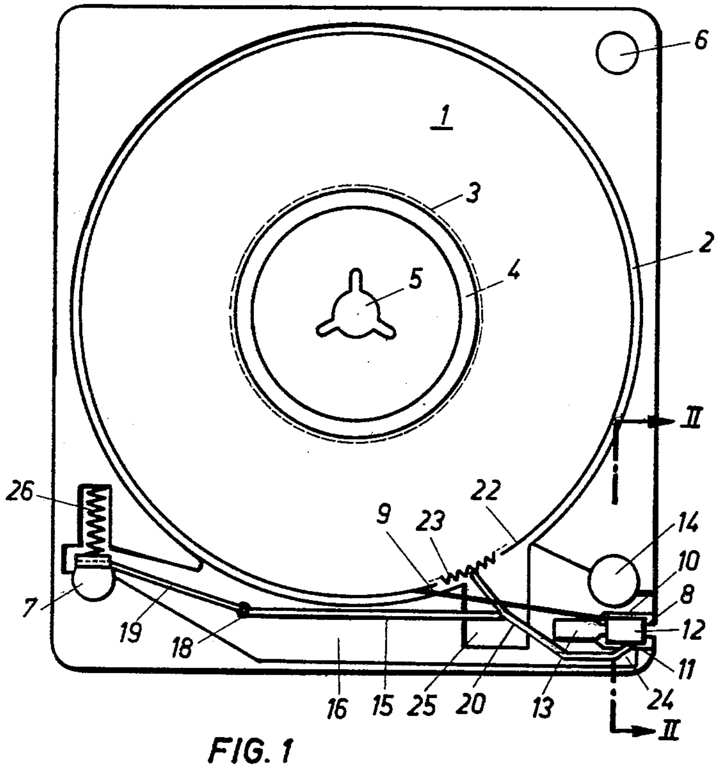

The invention relates to a magazine for a recording tape, which is arranged on a flanged spool rotatably arranged in the housing of the magazine. With such magazines it is known to use a device which hinders the rotation of the spool as soon as the magazine has been taken from the spool shaft of a recording apparatus. This may be achieved, for example by arranging a lever adapted to pivot in the magazine when same is taken from the apparatus so that it bears under the action of a spring on at least one of the flange edges, whereas, when the magazine is disposed on the apparatus in which the spool shaft is journalled, the lever is put out of action by the apparatus itself.

In accordance with the invention the magazine of such an apparatus has a space for accommodating an extension provided at the emerging end of the recording tape, while the pivotable lever for engaging the spool is also provided at one end with an arm, which hinders the said extension in the said space from emerging, when the magazine is taken from the apparatus since it is urged against the extension or is arranged in front of the exit opening.

In a preferred embodiment of the magazine according to the invention the end of the lever provided with the arm for engaging the tape extension has a further arm, which can be caused to engage or disengage at least one of the flange edges. If at least one of the flange edges is provided with toothing, the lever arm co-operating with the toothing and the toothing itself are preferably arranged in such a relatively unsymmetrical position that, when the magazine is taken from the apparatus a rotation is only possible in the winding-up direction of the record carrier.

In a magazine according to the invention the tape is effectively protected from damage but also the invention does not give rise to disturbance in the operation of the magazine when it is re-disposed on the apparatus, even if it is treated carelessly when disengaged from the apparatus. In the known arrangements braking of the spool alone in the disengaged magazine does not prevent a longer or shorter end of the tape from emerging or hanging out of the magazine. Additionally in the known arrangement the end of the tape can be drawn out, or when the disengaged magazine is strongly shaken, since the tape winding on the spool does not constitute a compact mass, on the contrary, the single tape layers are capable of sliding to a greater or smaller extent one over the other. By the provision of an extension at the beginning of the tape accommodated in a space inside the magazine it is no longer possible to draw the tape out of the magazine by hand. Since with a disengaged magazine, this extension is fixed in the magazine, the tape cannot emerge by accident, for example owing to vibrations. However, it is not sufficient to prevent only the end of the tape from emerging, since in the case of a fixed tape end and with a rotatable spool there may be loops readily formed in the tape inside the magazine, so that the operation of the magazine, when re-engaged, may be seriously disturbed under given conditions, or the tape is damaged. The construction is made such that when the casing is disengaged a rotation of the spool is only permitted in the winding-up direction, irregularities produced in the coil during the rewinding of the tape can be repaired afterwards.

The invention will now be described more fully with reference to the drawing which shows a presently preferred embodiment, to which the invention is not restricted however.

Figure 2:
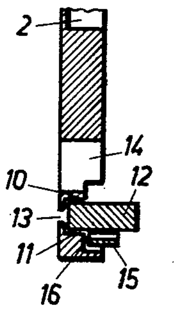
Figure 3:
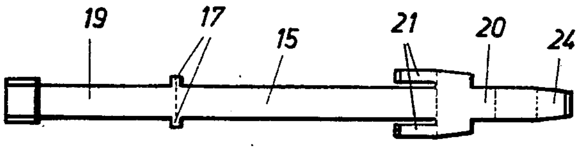

In the drawing FIG. 1 is a plan view of a magazine, the housing of which consists of two substantially identical halves, the top half being omitted. FIG. 2 is a sectional view taken on the line II—II in FIG. 1. FIG. 3 is a side elevation of a pivotable lever used in the magazine according to FIGURE 1.

The two halves of the magazine are formed by plates of approximately square shape, for example of synthetic substance, which are provided with cylindrical recesses 2 for accommodating the flanged spool 1. They are provided with central openings 3, by which the flanged spool 1, arranged in the housing and provided with a centering extension 4, is approximately centered. When the magazine is arranged on the apparatus, the spool is fixed in known manner with its central opening 5 on a spool disc. The apparatus has two pins which can be introduced into the openings 6 and 7 in the magazine, so that the position of the magazine on the apparatus is fixed. On the right-hand side wall of the magazine provision is made of an opening 8 through which the tape can emerge. The space provided in the interior of the magazine, and limited by the walls 10 and 11 for the accommodation of an extension 12, provided at the beginning of the tape 9 communicates with opening 8. The space 8 for the accommodation of the tape extension 12 has a slot 13 (FIG. 2) in the magazine half engaging the apparatus, through which slot can be taken an auxiliary member for engaging and sliding the extension 12 of the tape out of the magazine. The opening 14 serves for the introduction of a tape guide provided on the apparatus, by which the tape is guided during its travel along the scanning members.

The lever 15, which has preferably a certain degree of resilience, can be arranged by means of an elongated recess 16 in each of the magazine parts. The lever 15 is pivotably arranged by means of two gudgeons 17 received in two borings 18 of the magazine halves. The arm 19 is urged by a spring 26 in the direction of the opening 7, which is partly covered, when the magazine is disengaged. When the magazine is arranged on the apparatus, the lever is turned by a pin of the apparatus penetrating into the opening 7. The other lever arm has two tags 21 (FIG. 3), which urge against the flange edges 22 of the spool 1 in the rest position of the lever 15. To this end the flange edges are provided with teeth 23. The tags 21 have an oblique position and are orientated in the direction of winding up. It is thus possible to turn the spool 1 in the winding-up direction (clockwise), even when the tags 21 are pressed against the spool flanges whereas in the winding-off direction rotation is blocked. If desired, the teeth may be formed unsymmetrically on each flange. At one end the lever 15 has an arm 20 which is provided with an end 24, which urges against the tape extension 12 inside the magazine, when the lever 15, 20 is at rest, so that the tape is prevented from emerging. The extension 20 may, as an alternative, be formed so that its end 24 covers the opening 8 in the rest position. The lever 15, 20 preferably has a width slightly exceeding the width of the tape 9. Thus the tape 9 can emerge readily from the magazine between the tags 21. The recesses 16 have a greater depth in the area 25 of the tags 21 so that the tags 21 are freely movable. When the magazine is disposed on the apparatus and the lever arm 19 is urged back by the pin extending through the opening 7, the tags 21 release the spool 1 and the arm 24 releases the tape extension 12.

What is claimed is:

1. In a magazine for magnetic tape recorders, said tape having an extension at one end thereof and a recess in said magazine for receiving said extension, the combination comprising a spool for magnetic tape rotatably supported in said magazine, an elongated lever pivotally supported within said magazine, said lever having a portion engaging said extension in one position of said lever for securing said extension against accidental removal from said magazine and another portion engaging said spool in said one position for preventing rotation of said spool at least in an unwinding direction, and means for pivoting said lever.

2. The combination according to claim 1 wherein said spool includes a pair of flanges having a notched periphery and said other portion of said lever comprises a pair of inclined tags for engaging the notched periphery of said spool.

3. In a magazine for magnetic tape recorders, said tape having an extension at one end thereof and said magazine having a recess for receiving said extension, the combination comprising, a spool rotatably supported in said magazine and having a pair of side flanges for winding and unwinding said tape, an elongated lever pivotally supported in said magazine at a point intermediate its ends, means operatively connected with one end of said lever for imparting movement thereto, means operatively connected with said lever and extending in the direction of said flanges for arresting unwinding rotation of said spool in one position thereof and other means operatively connected with said lever simultaneously engaging said extension in said one position for securing said extension against accidental removal from said receiving recess.

4. In a magazine for magnetic tape recorders, said tape having an extension at one end thereof and said magazine having a recess for receiving said extension, the combination comprising, a spool rotatably supported in said magazine and having a pair of side flanges for winding and unwinding said tape, said flanges having a notched peripheral surface, an elongated lever pivotally supported in said magazine at a point intermediate the ends thereof, means for engaging one end of said lever to impart pivotal movement thereto and means for biasing said lever into a first position, said lever having a pair of tabs extending in the direction of said flanges and engaging said notches for arresting unwinding movement of said spool when said lever is in said one position, the other end of said lever simultaneously engaging said extension in said one position for preventing accidental withdrawal of said extension from said recess.

References Cited in the file of this patent

UNITED STATES PATENTS 2,778,880 Eash ------------------ Jan. 22, 1957